W. H. Sabin

Bedstead Fastening.

Nº 1,603. Patented May 12, 1840.

UNITED STATES PATENT OFFICE.

WM. H. SABIN, OF NEW MILFORD, PENNSYLVANIA.

BEDSTEAD-FASTENING.

Specification of Letters Patent No. 1,603, dated May 12, 1840.

*To all whom it may concern:*

Be it known that I, WILLIAM H. SABIN, of New Milford, in the county of Susquehanna and State of Pennsylvania, have invented an Improvement in the Manner of Forming and Securing the Fastenings for Bedsteads, by which improvement the said fastenings are affixed to the posts and rails with great facility and more securely than in the modes heretofore adopted; and I do hereby declare that the following is a full and exact description thereof.

The fastenings used by me are of the kind in which a wedge-formed piece, with dovetailed edges, is made to pass into a cavity corresponding therewith, one of them being affixed to the ends of the rails, and the other to the sides of the posts. So far the principle of fastening does not differ from that which has been heretofore known and used; but the nature of my improvement in such fastenings will be fully understood by reference to the accompanying drawings.

Figure 1:
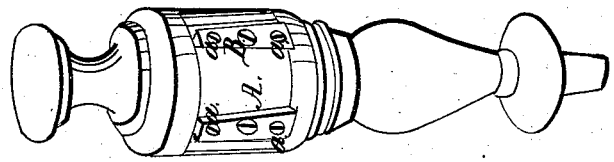

Figure 1, represents the improved fastening to be applied to the posts, and which are to receive those on the ends of the rail.

The part of the post usually left square, for the reception of the end of the rail, I make cylindrical, by turning it at the same time when the other parts of the post are turned, and to this cylindrical part of the post I affix the plate A, which is a section of a cylindrical tube, adapted to the curvature of the part of the post prepared to receive it. Upon this curved plate are the two dovetailed wedges B, B, the planes of which are at right angles with each other. These plates I usually let into the posts but they may be simply placed upon them, and secured in place by the screws a, a, passing through the wedge formed pieces. I mean sometimes, instead of the curved plate A, to use a complete ferrule of metal, which shall entirely surround the post.

Figure 2:
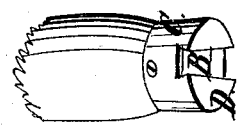
Figure 3:
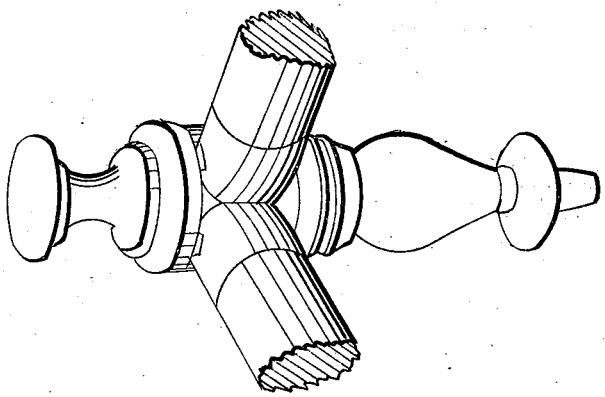

Fig. 2, is the corresponding fastening to be affixed on the ends of the rails, which rails are to be turned so as to receive the ferrule part C, of the fastenings. The end D, of the fastening is made hollowing, so as to fit the curvature of the plate A, on the posts; and within this hollow is the dovetailed excavation E, into which the wedge pieces B, B, are to slide. The ferrules C, are to be secured in place by means of screws. The posts must be larger than the rails, or the fastenings on the latter must be mitered at one edge as shown at Fig. 3, representing a post and two rails united together. These fastenings may be made of iron or of brass, but I intend, in general to make them of cast iron, which, if rendered malleable, may be thin, and light.

I do not claim to be the inventor of dovetailed fastenings for connecting the posts and rails of bedsteads; but what I do claim is—

My improved mode of forming and affixing them by a cylindrical ferrule, or segment of a ferrule to the posts; and by a ferrule to the rails, the end of which ferrule is hollowed to adapt it to the post, the whole being combined and arranged as above described.

WM. H. SABIN.

Witnesses:
 THOS. P. JONES,
 C. H. MILTBERGER.